A. T. POEHLMANN.
TOWING DEVICE.
APPLICATION FILED FEB. 5, 1916.
1,294,944.
Patented Feb. 18, 1919.
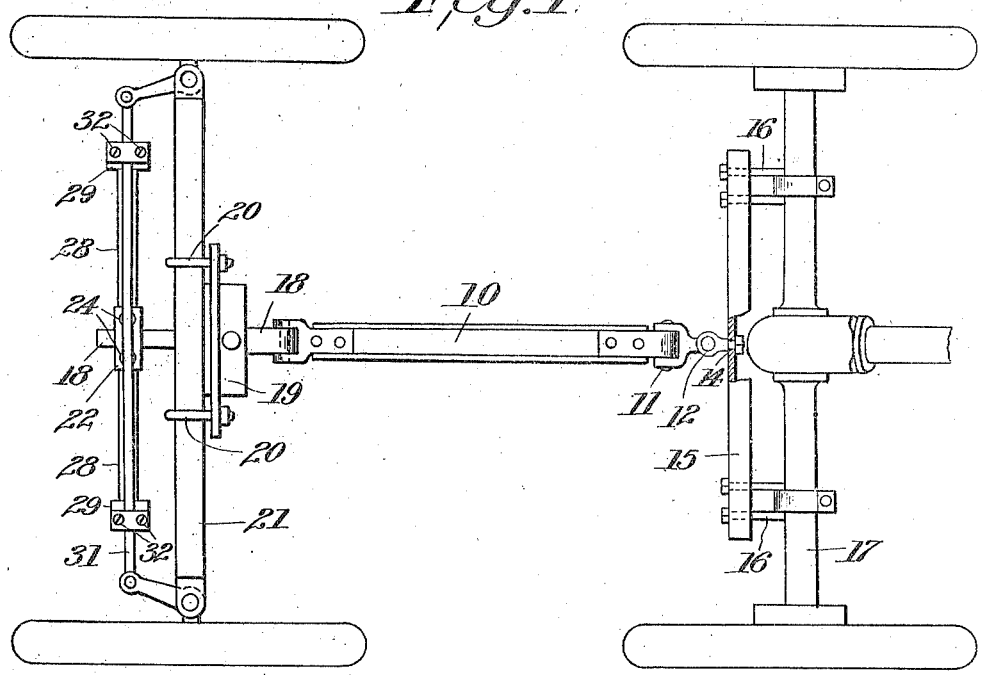
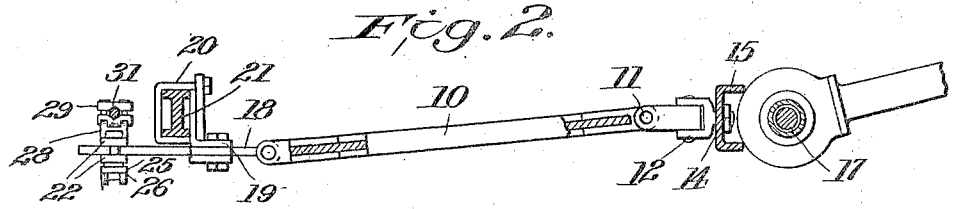
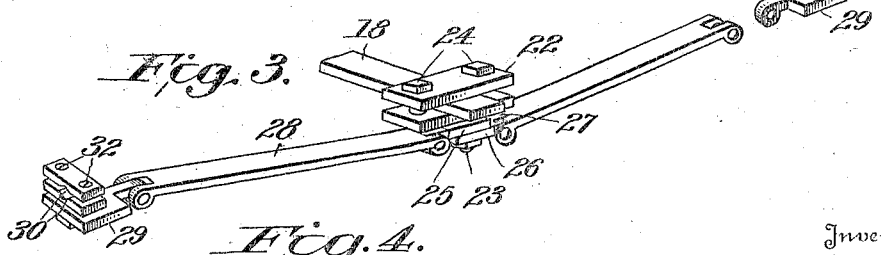
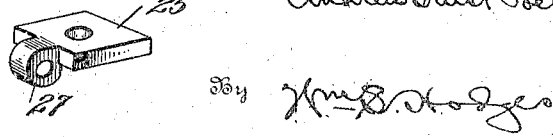
Inventor
Andrew Trust Poehlmann
By Wm. S. Hodges
Attorney

UNITED STATES PATENT OFFICE.

ANDREW TRUST POEHLMANN, OF CATONSVILLE, MARYLAND.

TOWING DEVICE.

1,294,944.          Specification of Letters Patent.     Patented Feb. 18, 1919.

Application filed February 5, 1916. Serial No. 76,414.

*To all whom it may concern:*

Be it known that I, ANDREW TRUST POEHLMANN, a citizen of the United States, residing at Catonsville, in the county of Baltimore and State of Maryland, have invented new and useful Improvements in Towing Devices, of which the following is a specification.

This invention is an improved device by means of which a disabled motor vehicle may be conveniently towed by another vehicle to a garage or other establishment for repairs.

When automobiles become disabled while in operation, the common practice is to send another car for the incapacitated machine, and to tow the latter to the garage or repair shop by means of a rope or ropes. This method is highly unsatisfactory because during the towing operation, the weight of the towed machine is intermittently applied to the cable, owing to inequalities in the road bed over which the machines are traveling, and it is not unusual for the strains incident to these conditions, to partially wreck the machine doing the towing, or at least so injure it as to necessitate extensive repairs. Another disadvantage of the present practice lies in the fact that it is impossible to control the movements of the towed vehicle, in any manner, unless an operator is placed at the steering wheel, thereby necessitating the employment of at least two men to bring in the disabled machine.

The present invention has for its object to provide improved means for positively coupling two motor vehicles, in such manner as to avoid the consequences of the strains imposed upon the machine employed to furnish the motive power. A further object is to provide a coupling device having means for attachment to the steering rods of the disabled machine, whereby the latter may be automatically steered by the machine which does the towing, thus avoiding the necessity of sending an extra man.

The invention will be hereinafter fully set forth and particularly pointed out in the claims.

In the accompanying drawings:—

Figure 1 is a plan view illustrating the invention. Fig. 2 is a side view thereof. Fig. 3 is an enlarged detail view illustrating the steering device, detached. Fig. 4 is a detail of an element of the steering device.

Referring to the drawing, 10 designates a draw bar of any suitable or preferred construction, the same being shown in Fig. 1, in the position occupied when in use. The forward end of said draw bar is connected by a gimbal joint 11 to a member 12, which is swiveled at 14 in a coupling bar 15, provided with clips 16, by means of which it may be attached to the rear spring, body or rear axle 17 of an automobile.

Pivotally attached to the rear end of the draw bar 10 is a tongue 18, to which is pivotally attached the horizontal member of an angle plate 19, the vertical member of which is shaped to be clamped between the front axle of a disabled vehicle, by means of clips 20 attached to a clamping plate, as illustrated in Fig. 1. The axis of the pivotal connection between coupling member 19 and the tongue 18, is at right angles to the axis of the pivotal connection between said tongue and the draw bar 10, so that the draw bar may have vertical movement relative to the vehicle being towed, and also have horizontal movement to permit slight variations in the course of the two vehicles.

The rear end of the tongue 18 projects beyond the coupling member 19, and is preferably reduced in width to receive and support a clip 22, provided with a depending stud 23. Said clip comprises two relatively adjustable plates between which the tongue extends, said plates being clamped in any adjusted position by means of bolts and nuts 24. Rotatably mounted upon the stud 23 are collars 25 and 26, each having an ear 27, pivotally connected to the forked end of an operating arm 28, there being one arm 28 for each collar. Pivotally connected with the outer ends of the respective operating arm, are clamps 29, each composed of upper and lower plates, grooved at 30, to receive the steering rods 31 of the disabled machine, said plates being held tightly against said rods by means of nuts and bolts 32.

In practice, when it is desired to utilize the invention, the coupling bar 15 is secured to the rear axle of the machine that is to do the towing, or to some other desirable part of said machine, by means of the clips 16. The coupling member 19 is then secured to the front axle of the disabled machine, by means of the clips 20. Thus the two vehicles will be securely coupled together so that movement of the vehicle doing the towing is imparted to the other vehicle. In order to insure the automatic steering of the towed vehicle, so as to follow the course of the leading vehicle, the clip 22 is attached to the tongue 18, and the collars 25 and 26 are placed in position upon the stud 23. The clip is moved to a position that will bring said collars, and the attached operating arms 28 and clamps 29, beneath the steering rod 31, so that said clamps 29 may be made to engage said steering rod. It will be observed that if the construction of the machine is such that the clip 22 cannot be brought directly opposite the steering rods, the collars 25 and 26 will rotate sufficiently upon the stud 23, to permit the operating arms to be attached to the steering rods. By means of this arrangement, when the tongue 18 swings on the pivotal connection with the coupling member 19, as the course of the leading machine varies, the operating arms 28 are correspondingly moved with the tongue, and their movement is imparted to the steering rods 31, thereby insuring that the disabled machine will be automatically steered so as to follow the exact course of the leading machine.

Having thus explained the nature of my invention and described an operative manner of constructing and using the same, although without attempting to set forth all of the forms in which it may be made, or all of the forms of its use, what I claim is:—

1. An improved towing device comprising a draw-bar, means for attaching the same to a motor vehicle, a flat tongue pivoted at one end to said draw-bar, an angle plate, a clamping plate provided with clips for attachment to a vehicle to be towed, said plate being constructed to clamp one member of said angle plate between it and the front axle of a disabled vehicle, means for pivotally connecting the tongue between its ends to the other member of said angle plate, a keeper slidably mounted on said tongue, and means for connecting said keeper with the steering rod of said disabled vehicle.

2. An improved towing device comprising a draw-bar having means at one end for engaging a portion of a motor vehicle, a tongue pivotally connected to the other end of said draw bar, means for pivotally connecting said tongue to the vehicle to be towed, a clip carried by said tongue, and adjustable to be positioned beneath the steering rod of the vehicle to be towed, oppositely extended operating arms pivoted at their inner ends to said clip, and clamps pivoted to the outer ends of said operating arms and positioned to engage the said steering rod.

3. An improved towing device comprising a draw bar having means at one end for engaging a portion of a motor vehicle, a tongue pivotally connected to the other end of said draw bar, means for pivotally connecting said tongue to the vehicle to be towed, a depending stud carried by said tongue, collars mounted to rotate upon said stud, and operating arms pivotally connected to the respective collars and having means to engage the steering rods of the last mentioned vehicle.

4. An improved towing device comprising a drawbar, means for attaching the same to a motor vehicle, a tongue pivotally connected to one end of said drawbar, means for pivotally connecting the tongue to the vehicle to be towed, a clip carried by said tongue, said clip being adjustable to be positioned beneath the steering rod of the vehicle to be towed, a stud depending from said clip, and arms pivoted to said stud and having means whereby they may be attached to the steering rod of the vehicle to be towed.

In testimony whereof I have hereunto set my hand in presence of two subscribing witnesses.

ANDREW TRUST POEHLMANN.

Witnesses:
JOHN H. DAMES,
R. GILBERT SHILLMAN.